United States Patent

[11] 3,580,218

| [72] | Inventors | Friedrich Grundschober<br>Confignon, Geneva;<br>Joerg Sambeth, Carouge, Geneva, both of,<br>Switzerland |
|---|---|---|
| [21] | Appl. No. | 704,138 |
| [22] | Filed | Feb. 8, 1968 |
| [45] | Patented | May 25, 1971 |
| [73] | Assignee | Aktiebolaget Stadex<br>Malmo, Sweden |
| [32] | Priority | Feb. 2, 1967 |
| [33] | | Switzerland |
| [31] | | 2039/67 |

[54] APPARATUS FOR APPLYING A COATING OF ADHESIVE MATERIAL ON TO A SUPPORT
6 Claims, 1 Drawing Fig.

[52] U.S. Cl. .................................................. 118/621,
117/17, 117/21, 118/419, 118/429, 118/608,
118/642
[51] Int. Cl. ......................................................... B44d 1/094,
B44d 1/44
[50] Field of Search ........................................... 117/21, 17;
118/429, 608, 621, 642

[56] References Cited
UNITED STATES PATENTS

| 3,480,456 | 11/1969 | Forkner ....................... | 117/21 |
| 1,901,324 | 3/1933 | Novotny ....................... | 117/119.2 |
| 2,706,311 | 4/1955 | Durst et al. .................... | 260/2.5X |
| 2,889,291 | 6/1959 | Moore .......................... | 260/2.5X |
| 3,019,126 | 1/1962 | Bartholomew ............... | 117/17 |
| 3,202,533 | 8/1965 | Sachsel et al. ................. | 117/72 |
| 3,279,936 | 10/1966 | Forestak ....................... | 117/16X |
| 3,282,249 | 11/1966 | Ramsay ........................ | 117/21X |
| 3,446,642 | 5/1969 | Webb ........................... | 117/21 |

*Primary Examiner*—William D. Martin
*Assistant Examiner*—Raymond M. Speer
*Attorney*—Waters, Roditi, Schwartz & Nissen

ABSTRACT: The invention provides an apparatus for applying a coating of adhesive material on to a support, e.g. a strip of paper. To apply this coating, one surface of the strip is fed over a guide surface through a fluidized bed of the adhesive material in cooled comminuted form, the bed particles which come into contact with said surface being caused to become fixed thereto.

PATENTED MAY 25 1971
3,580,218
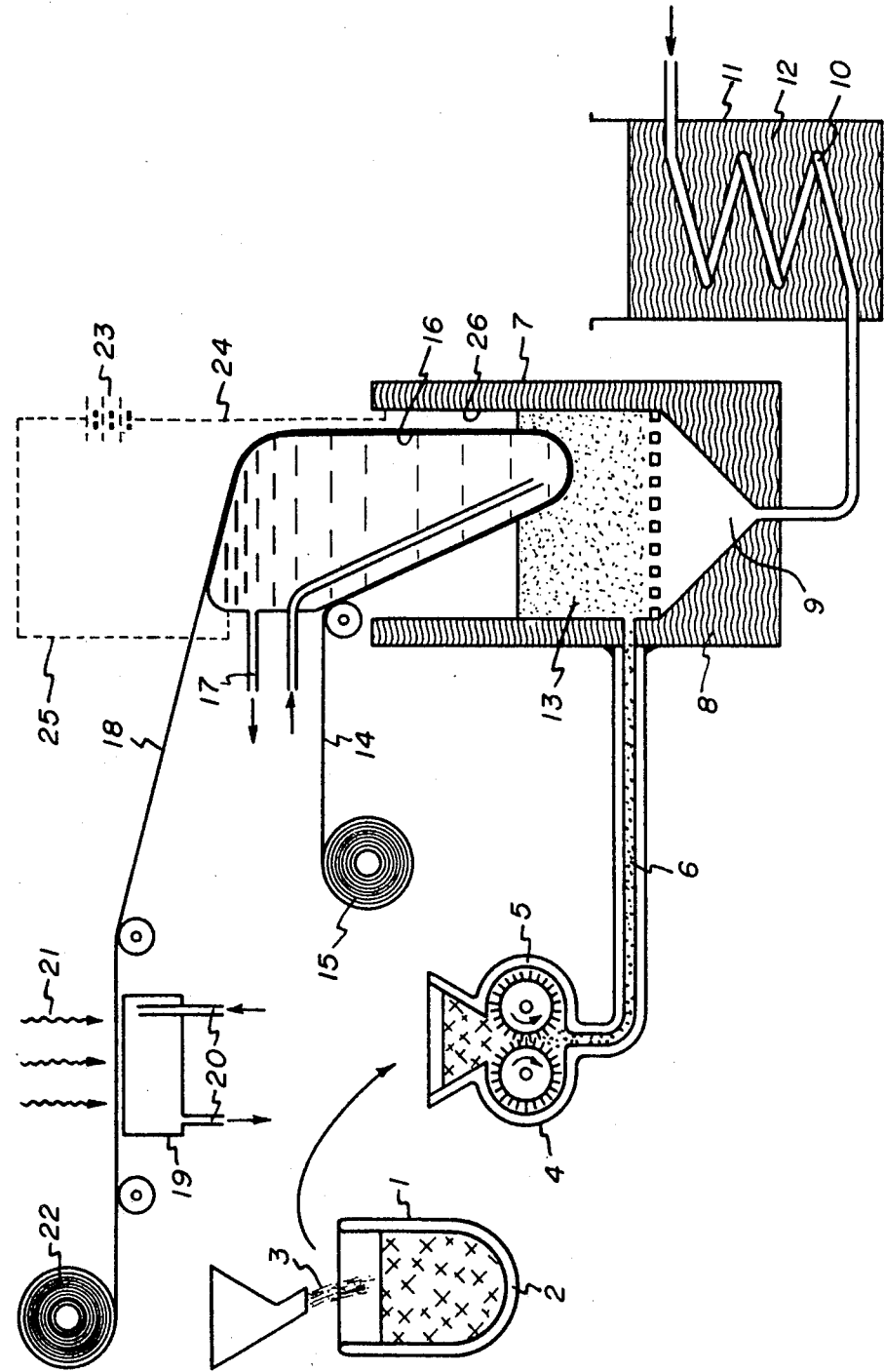

APPARATUS FOR APPLYING A COATING OF ADHESIVE MATERIAL ON TO A SUPPORT

This invention relates to an apparatus for applying a coating of adhesive material on to a support.

There are in existence various methods for applying coatings of adhesive material on to supports, in particular on bandlike supports which, once coated, form self-adhesive tapes (also termed pressure-sensitive adhesive tapes). These methods broadly fall into two main classes. With the methods falling into the first class, the adhesive material is diluted in a suitable solvent, the solution is applied on to the support by calendering, by use of a doctor blade or by other techniques, and the solvent is evaporated. With the methods falling into the second class, the adhesive material is heated until it becomes quite fluid and the fluidized material is applied on to the support by techniques similar to those restored to with the first class.

These known methods have substantial drawbacks. Thus, the methods falling into the first class cannot be used if the support is itself made of a material which is soluble in the solvent used to dissolve the adhesive material. The evaporation of the solvent is a slow operation and, in order for this method to be economical, the evaporated solvent must be recovered, thus necessitating costly ancillary installations. Moreover, these methods are ill-suited for coating supports having an uneven surface, in particular spongy supports, since the dissolved adhesive material which penetrates into the pores is completely wasted. Further, it is difficult to deposit a thick layer of adhesive material as it then becomes very difficult to evaporate the solvent which forms undesirable bubbles.

With the methods falling into the second class, the action of heating the adhesive material can lead to partial decomposition of the latter and/or of the support. In addition, a material which becomes sufficiently fluid at a temperature which does not bring about decomposition generally has low adhesiveness at ambient temperature.

An object of the invention is to overcome these drawbacks.

According to the invention, there is provided an apparatus in which support is practiced. The method comprises solidifying said adhesive material through support, which comprises solidifying said adhesive material through cooling it at low temperature, comminuting the solidified adhesive material into particles by crushing the solidified material at low temperature, forming from the comminuted material a fluidized bed maintained at low temperature, bringing said support surface into contact with the fluidized bed, and fixing on to said surface the comminuted material particles of the fluidized bed which come into contact therewith.

To help fix the fluidized bed particles on the support surface to be coated, it may be advisable to heat the latter so that the particles may melt locally and adhere to the support. Other fixing techniques may also be resorted to, for instance by setting up an electric field between the fluidized bed and the support surface to be coated whereby the particles may become fixed to this surface by electrostatic attraction. Clearly when the support has other surfaces, each such surface can be coated with adhesive in a similar manner, e.g. successively, provided that no heating of the support is involved for particle fixing on the support surface.

Use can also be made of a porous support, e.g. nonwoven fabrics, gauze, and cellular polymer foam made for instance from rubber, polyvinyl chloride and polyurethane, which is deeply impregnated with adhesive material. When this support consists of a two-faced strip of thin material, only one of its faces is impregnated, which impregnation can be such that the support can become adhesive on both of its faces.

The self-adhesive material that is used can be mixed with a nonadhesive filler, e.g. zinc oxide or clay. By way of filler, use can also be made of a material having a softening point above ambient temperature, for instance a thermoplastic material such as, a wax, polyvinyl acetate or a polyamide. Use can also be made by way of filler, instead of such a thermoplastic material, of a natural water-soluble adhesive, e.g. bone glue and starch, or a water-soluble synthetic polymer substance, e.g. polyvinyl alcohol and polyacrylic acid.

Depending on the kind of adhesive material that is used, the particles that are fixed to the support can, after having issued from the fluidized bed, have sufficiently melted and spread over the support surface for the coating to have lost its granular texture. Although a granular texture can enhance adhesiveness, it may nevertheless be preferable for other reasons to achieve a homogeneous texture. This may require a subsequent additional heating operation of the layer of particles and possibly of the support in order fully to melt the particles and to achieve uniform spreading of the adhesive layer. A subsequent heating operation may in fact be essential when the fluidized bed particles are fixed to the support otherwise than by heating, as by electrostatic attraction. Excellent spreading of the adhesive material layer can be achieved by for instance passing the support between pressure-exerting rollers lined with antiadhesive material, e.g. tetrafluoroethylene. For this, the adhesive material must of course at that time be sufficiently softened.

The above-described method does away with having initially to heat the adhesive material through and is not subject to the drawbacks that are inherent in the use of solvents. It is particularly well suited for continuous, high-speed, manufacture of self-adhesive articles, whether the support is made of smooth material, as with pressure-sensitive tapes, of textile material, as with sticking plasters, of spongy material as with draught strips made of synthetic foam, or of metal. When the support consists of a two-faced strip and is provided with a coating of adhesive material on both of its faces, it may be useful, if it is intended to store the resultant tape in roll form, to intercalate a sheet of nonadhesive material, e.g. polytetrafluoroethylene or siliconized paper, between the consecutive layers of the rolled tape to prevent the tape from sticking to itself and hence be unwound when needed. If the strip is only coated with adhesive material on one face, it suffices to impregnate or to cover the other face with an antiadhesive substance. If, however, use is made of supports consisting of strips or plates which are coated on one face thereof with adhesive material, with the opposite face thereof left uncovered, the supports can be stacked to produce products of a laminar type. Such products could also be produced by stacking strip platelike supports which are coated on both faces thereof with adhesive material, in alternation with layers of one or more other suitable materials, or of the same material as the supports. Examples of such laminar-type products are corrugated cardboard and plywood.

The adhesive material may for example consist of a mixture of elastomers and resins, which mixture may have added thereto plastifiers, fillers and antioxidants. For instance, the elastomers may consist of natural rubber, synthetic rubber of the butadiene-styrene (GR–S) type, polyisobutylene, polyvinyl ether. The resins may consist of hydrogenated collophane, collophane esters, polyterpene hydrocarbons, or hydrogenated coumarone indene resins.

The following examples will further illustrate the above method.

EXAMPLE 1

The adhesive material is a mixture of Lutonal IC (trademark for a polyvinyl isobutyl ether supplied by Badische Anilin und Soda Fabrik, A.G.—B.A.S.F.) and of staybelite (trademark for a hydrogenated collophane supplied by Hercules Powder Co.) in the proportion of 65 to 35. The polyvinyl ether is mixed with the hydrogenated collophane to produce a tacky viscoelastic mass. This mass is cooled with liquid air (−210° C.) thereby converting it into a solid brittle mass, whereupon this brittle mass is crushed in a grinder which is also cooled with liquid air. A powder is thus obtained which is suspended in a current of air cooled with dry ice, in such a way as to form a fluidized bed. This fluidized bed is formed in a vessel cooled with dry ice. A strip of paper forming the support, is caused to pass through the fluidized bed. The paper strip is heated while passing through the fluidized bed so that the particles thereof which come into contact with the paper strip soften sufficiently to become fixed to its surface. The latter hence becomes covered with a layer of powder. The thus covered strip, upon issuing from the fluidized bed, is then subjected to a subsequent heating operation in the course of which the layer of adhesive material, which is still in powder form, is subjected to infrared irradiation while the support as such is made to pass over a heater. The adhesive material melts and spreads into a uniform layer.

The effectiveness of this method is illustrated by the following test. After a 15-hour storage in ambient air and temperature, the self-adhesive tape thus produced was pressed on to a glass plate to which it adhered by means of the adhesive material with which it has been coated as has just been described. The tape was then turned back through 180° and stripped off and the force required for this was measured with a dynamometer. At 25° C., this test showed that a pulling force of about 500 g. to 700 g. is necessary when the surface of adhesion is 1 cm.² This result is wholly comparable with those obtained with self-adhesive tapes produced by known methods.

EXAMPLE 2

The same procedure was resorted to as in example 1 but, by way of adhesive material, use was made of a mixture having the following composition (the indicated percentages being by weight):

| | Percent |
|---|---|
| Natural rubber | 20 |
| Oppanol B 150 (trademark for a polyisobutylene supplied by B.A.S.F.) | 20 |
| Oppanol B 15 (trademark for another polyisobutylene supplied by B.A.S.F.) | 29 |
| Staybelite | 30 |
| Santovar A (trademark for a 2,5-di-tertiary-amylhydroquinone supplied by Monsanto Chemical Co.) | 1 |

The above mixture was prepared by kneading with a calender heated to a temperature of 60° C.

EXAMPLE 3

The procedure was the same as in the previous example but, by way of adhesive material, use was made of the following mixture (the indicated percentages being by weight).

| | Percent |
|---|---|
| Lutonal IC | 40 |
| Herculyn H (trademark for a methyl ester of hydrogenated collophane supplied by Hercules Powder Co.) | 10 |
| Cellolyn 21 (trademark for a dihydroabiethylphthalate supplied by Hercules Powder Co.) | 25 |
| Paraffin oil | 5 |
| Zinc oxide | 20 |

The cooling and the crushing of the resultant viscoelastic mass were carried out at −70° C. (dry ice) and not this time at −210° C.

EXAMPLE 4

The procedure was the same as in the previous example but, by way of adhesive material, use was made of the following mixture (the indicated percentages being by weight):

| | Percent |
|---|---|
| Polyvinylpyrrolidone | 30 |
| Polyacrylic acid | 30 |
| Glycerol di-(2-hydroxypropyl) ether | 20 |
| Glycerol tri-(2-hydroxyethyl) ether | 20 |

By way of support use was made either of strip paper or of cellulose triacetate tape. In both cases a self-adhesive tape was obtained which could easily be detached, once applied, by moistening the adhesive material.

EXAMPLE 5

The procedure was the same as in the previous example but, by way of adhesive material, use was made of the following mixture (the indicated percentages being by weight):

| | Percent |
|---|---|
| Natural rubber | 10 |
| Oppanol B 150 | 10 |
| Oppanol B 15 | 15 |
| Staybelite | 15 |
| Starch | 50 |

A self-adhesive tape was obtained which could also be applied by moistening the adhesive material.

EXAMPLE 6

The procedure was the same as in the previous example except that 50 percent by weight of bone glue was used instead of the 50 percent by weight of starch to form the adhesive material. Here again a self-adhesive tape was obtained which could also be applied by moistening.

EXAMPLE 7

The procedure was the same as in example 5 except for the use of 50 percent by weight of polyvinyl acetate in place of the 50 percent by weight of starch. A self-adhesive tape was obtained whose adherence was particularly high when heated while being applied.

EXAMPLE 8

The procedure is the same as in example 1 except for the use, by way of adhesive material, of the following mixture (percentages being by weight):

| | Percent |
|---|---|
| Oppanol C | 30 |
| Staybelite | 20 |
| Versamid 940 (trademark for a polyamide supplied by General Mills, Inc.) | 50 |

EXAMPLE 9

The procedure was the same as in example 3, except for the use of a strip of cotton fabric by way of support. The resultant product can be used as a self-adhesive medical plaster.

EXAMPLE 10

The procedure was the same as in example 1, except for the use of a strip of gauze by way of support. The resultant product is covered on both faces with adhesive material which completely coats the meshes of the gauze.

EXAMPLE 11

The procedure is the same as in example 1, except that instead of heating the paper strip while travelling through the fluidized bed, a potential difference of 5 kv. is applied between the paper strip and the inner wall of the vessel containing the fluidized bed.

Here again a self-adhesive tape is obtained which also exhibits a good adherence when heated upon application.

According to the invention there is provided an apparatus for applying a coating of adhesive material on to a face of a support, which comprises refrigerating means for solidifying, through congealing, said adhesive material, refrigerated grinding means for comminuting the solidified adhesive material into particles, a vessel for receiving the comminuted material, supply means for supplying a stream of air to said vessel to form therein a fluidized bed from said comminuted material, refrigerating means adapted for refrigerating said stream of air and said bed, means for dipping the support surface to be coated into the refrigerated bed, and means for ensuring that the particles coming into contact with said surface become fixed thereto.

The single FIGURE of the accompanying drawing illustrates by way of example a particular embodiment of the apparatus provided by the invention, which embodiment is intended to produce, in continuous manner, a tape which is coated on one of its faces with adhesive material.

The illustrated apparatus comprises a refrigerator consisting of a double-walled vessel 1 (Dewar flask) containing between the walls thereof a low temperature refrigerating medium 2 (liquid air). This vessel receives the adhesive material which solidifies therein into a brittle mass, and discharges its contents into a grinder 4 which is also cooled by a low temperature refrigerating medium 5 (liquid also). The comminuted material issuing from the grinder 4 is conveyed, via a duct 6 cooled to a low temperature, into a vessel 7 which is cooled by a mass of dry ice 8 and which moreover receives a stream of air 9 previously cooled by being circulated in the coil 10 of a refrigerator 11 cooled by a mass of dry ice 12. Within this airstream 9 the comminuted adhesive material forms a fluidized bed 13. The support, consisting of a continuous tape 14 supplied by a storage spool 15, slides along a metal guide 16 heated to about 60° C. by a heating fluid circulating in ducts 17. The shape of this guide 16 is such that the support 14 is made to dip into the fluidized bed 13 so that one face of the issuing tape 18 is covered over with a layer of comminuted adhesive material. The tape then slides over a heater 19, heated to about 80° C. by a heating fluid circulating in ducts 20. It is thus heated through the uncovered face thereof whereas its covered face is subjected to infrared irradiation 21. This dual heating action causes the particles to melt so that the adhesive material may spread into a uniform layer. Upon issuing from this additional heating station, the tape is ready for use and is collected up on a takeup spool 22.

In this apparatus, the adhesive material is refrigerated and comminuted at the temperature of liquid air (−210° C.), the fluidized bed is maintained at the temperature of dry ice (−70° C.), the guide 16 is heated to +60° C. and the additional heater 19 operates at a temperature of +80° C.

By way of variant, FIG. 1 also shows in phantom view electric means for fixing the particles on the exposed face of support 14. These means include an electric source 23 respectively connected by lines 24 and 25 to the inner wall 26 of the vessel 7 containing the fluidized bed 13 and to the guide 16. In this case, the inner wall 26 of vessel 7 is made electrically conductive.

We claim:

1. Apparatus for applying a coating of adhesive material to a face of a support, which comprises refrigerating means for solidifying, through congealing, said adhesive material, refrigerated grinding means for comminuting the solidified adhesive material into particles, a vessel for receiving the comminuted material, supply means for supplying a stream of air to said vessel, to form therein a fluidized bed from said comminuted material, refrigerating means adapted for refrigerating said stream of air and said bed, means for dipping the support surface to be coated into the refrigerated fluidized bed, and means for ensuring that the particles coming into contact with said support surface become fixed thereto.

2. Apparatus according to claim 1, wherein said dipping means include a guide for causing said support to travel through said fluidized bed to bring said surface thereof into contact with said bed.

3. Apparatus according to claim 1, wherein said particle-fixing means includes heating means for raising said dipping means to a temperature such as to ensure localized melting of said particles.

4. Apparatus according to claim 1, wherein said fixing means includes an electric voltage source connected to said vessel and to said dipping means to set up between the fluidized bed and said surface an electric field for the fixing of said particles.

5. Apparatus according to claim 1, further comprising a heating station for heating said surface, as it issues from said vessel to a temperature such as to melt the particles fixed thereto and to cause said particles to form on said surface a smooth uniform layer.

6. Apparatus according to claim 5, wherein said heating station includes an infrared radiation source.